United States Patent [19]

Walther

[11] 4,311,771

[45] Jan. 19, 1982

[54] PROCESS FOR PRODUCTION OF ELECTRICAL ENERGY FROM THE NEUTRALIZATION OF ACID AND BASE IN A BIPOLAR MEMBRANE CELL

[75] Inventor: James F. Walther, Skaneateles, N.Y.

[73] Assignee: Allied Chemical Corporation, Morris Township, Morris County, N.J.

[21] Appl. No.: 183,483

[22] Filed: Sep. 2, 1980

Related U.S. Application Data

[63] Continuation of Ser. No. 972,129, Dec. 21, 1978.

[51] Int. Cl.$^3$ .............................................. H01M 2/38
[52] U.S. Cl. ...................................... 429/51; 429/14; 429/101; 204/180 P
[58] Field of Search ....................... 429/50, 51, 14, 72, 429/80, 81, 101; 204/180 P

[56] References Cited

U.S. PATENT DOCUMENTS

| | | | |
|---|---|---|---|
| 2,694,742 | 11/1954 | Harding | 429/89 |
| 2,700,063 | 1/1955 | Manecke | 429/194 |
| 3,114,658 | 12/1963 | Zaromb | 429/89 |
| 3,214,296 | 10/1965 | Smatko | 429/68 |
| 3,562,139 | 2/1971 | Leitz | 204/180 P X |
| 3,705,846 | 12/1972 | Kato et al. | 204/180 P |
| 3,787,304 | 1/1974 | Chlanda et al. | 204/180 P |
| 4,024,043 | 5/1977 | Dege | 204/180 P X |
| 4,116,889 | 9/1978 | Chlanda et al. | 204/180 P |

FOREIGN PATENT DOCUMENTS 1378073 10/1964 France.

OTHER PUBLICATIONS

Zeigerson and de Korosy, Israel Jour. of Chem., vol. 9, 1971, pp. 483–497.
F. L. Ramp, "Secondary Batteries Powered by Forced Ionization", Nature, vol. 278, Mar. 22, 1979, pp. 335–337.

*Primary Examiner*—Charles F. Lefevour
*Attorney, Agent, or Firm*—Thomas D. Hoffman; Anthony J. Stewart

[57] ABSTRACT

Electrical energy is generated from acid-base neutralization reactions in electrodialytic cells. Permselective bipolar membranes in these cells are contacted on their cation selective faces by aqueous acid streams and on their anion-selective faces by aqueous base streams. Spontaneous neutralization reactions between the basic anions and acidic cations through the bipolar membranes produce electrical potential differences between the acid and base streams. These potential differences are transmitted to electrodes to produce electrical energy which is withdrawn from the cell.

12 Claims, 3 Drawing Figures

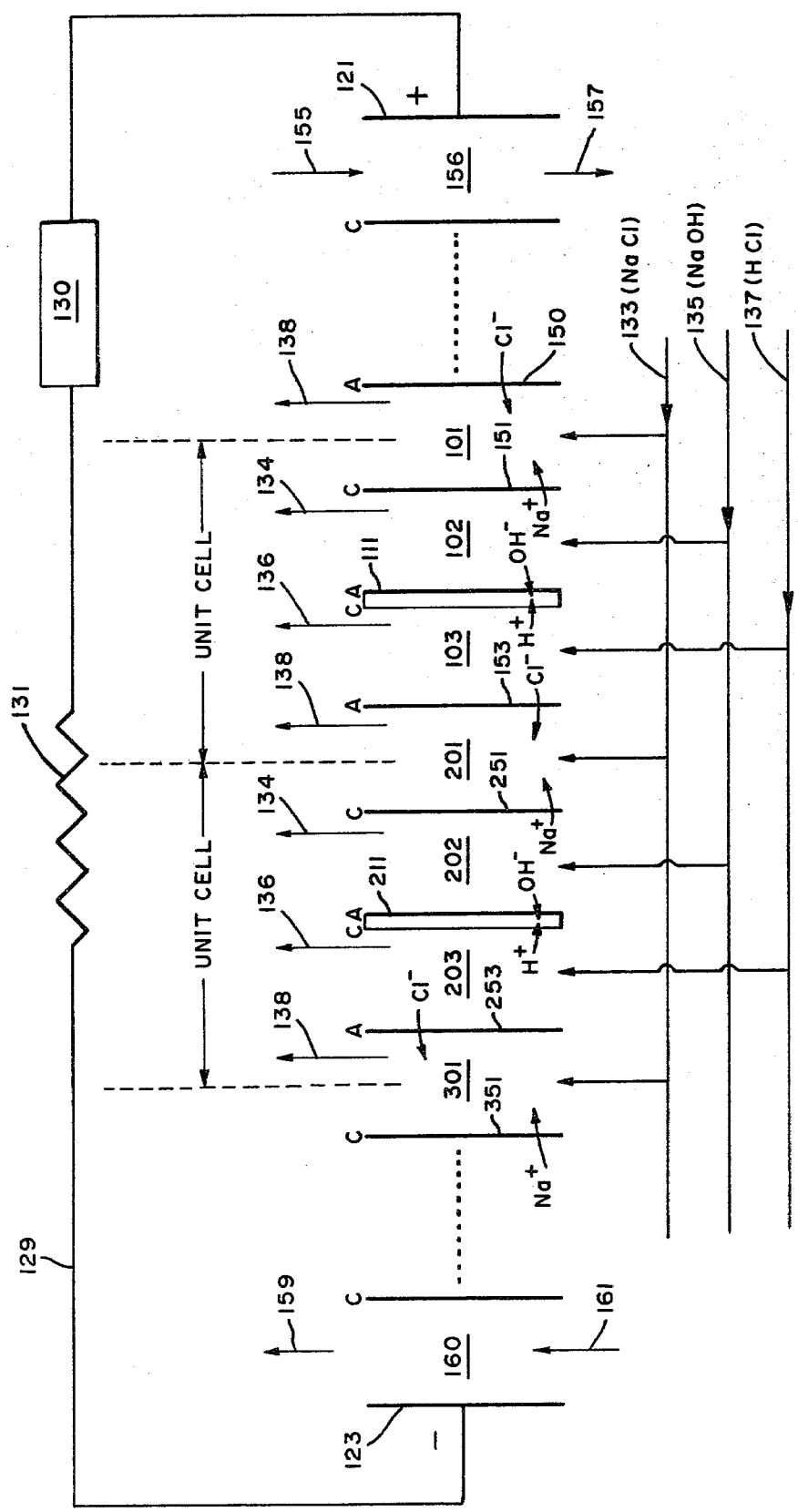

PROCESS FOR PRODUCTION OF ELECTRICAL ENERGY FROM THE NEUTRALIZATION OF ACID AND BASE IN A BIPOLAR MEMBRANE CELL

This is a continuation of application Ser. No. 972,129, filed Dec. 21, 1978.

BACKGROUND OF THE INVENTION

1. Field of the Invention

This invention relates to a process for the production of electrical energy from the neutralization of aqueous acid and base streams in a cell having a bipolar membrane.

2. Description of the Prior Art

Electrochemical cells useful for the interconversion of chemical and electrical energy are well known in the prior art. When at least two distinct regions, e.g., unit cells or half cells, having unequal chemical potentials are connected ionically through suitable dividers at least semiporous to ion current flow and electrically through a suitable electrical connecting means between electrodes in contact with these regions, electrical energy, i.e., electron current is allowed to flow through the electrical connecting means. Unequal chemical potentials created by differences in concentration or differences in electron-acceptance i.e., reducibility, and electron release, i.e., oxidizability, are well known to one of ordinary skill in the art.

Recent advances in bipolar membrane technology have allowed production of commercially important acids and based from neutral salts by electrodialytic water-splitting. For example, U.S. Pat. No. 3,787,304 describes a process for the production of hydrofluroic acid and hydroxide base by electrodialytic water-splitting of fluoride salt in a bipolar membrane cell. However, the production of electrical energy by spontaneous neutralization of aqueous acid and base streams is not taught.

Zeigerson and deKorosy (Israel Journal of Chemistry, 9 (No. 4), pp. 483–97 (1971).) conducted rectification experiments with a bipolar membrane cell and disclose that a small amount of electrical power can be generated from acid-base neutralization across a bipolar membrane when acid is on the anion permeable face and base is on the cation permeable face of the membrane. However, the cell does not operate reversibly and does not generate commercially significant quantities of electrical power.

Japanese Pat. No. 50-83735 discloses cells constructed with carbon electrodes positioned in aqueous acid and base solutions separated by a porous diaphragm. Although this diaphragm permits neutralization and buffering between the acid and base solutions, the cell operates without bipolar membranes to generate electrical enery from spontaneous oxidation-reduction reactions at the electrodes.

While it is known in the prior art that dissociation of a salt into an acid and a base requires the input of electrical energy, the prior art has not recognized any efficient method to create, collect and employ electrical potential differences from neutralization reactions of acids and bases.

It is accordingly an object of the present invention to provide a process for the production of electrical energy from the spontaneous neutralization of aqueous acid and base at a bipolar membrane.

It is another object of the present invention to provide a process which generates significant electrical energy by coupling spontaneous neutralization reactions in a bipolar membrane cell with energy-supplying or energy-demanding electrodes.

It is a further object of this invention to provide a commercially useful, regenerative process for electrical energy storage to permit leveling of power loads on electric utility generating plants.

It is a still further aim of the present invention to produce commercially useful electrical power from spontaneous neutralization of acidic and basic industrial effluent streams and from process neutralization used in chemical manufacture.

Additional objects and features of the present invention will become apparent from the disclosure which follows.

BRIEF DESCRIPTION OF THE INVENTION

According to the present invention, there is provided a process for the production of electrical energy from the neutralization of acid and base in a cell with a bipolar membrane having a cation-permselective face and an anion-permselective face, said membrane being positioned between two electrodes in electrical connection with one another, said connection having an electrical receiving means to receive electrical energy from said electrodes, which comprises the steps of:

(a) simultaneously contacting an acid stream with said cation-permselective face of said bipolar membrane and a base stream with said anion-permselective face of said bipolar membrane whereby the contact through said faces of said bipolar membrane of said acid and base streams produces an electrical potential difference between said streams;

(b) transmitting said potential difference to said electrodes; and (c) withdrawing electrical energy produced thereby from said electrodes through said electrical connection to said electrical receiving means.

BRIEF DESCRIPTION OF THE DRAWINGS

FIG. I is a diagram of one embodiment of the process of the present invention.

FIG. II is a diagrammatic illustration of another embodiment of the present invention which employs two porous dividers to separate the bipolar membrane from the electrodes.

Figure 1:
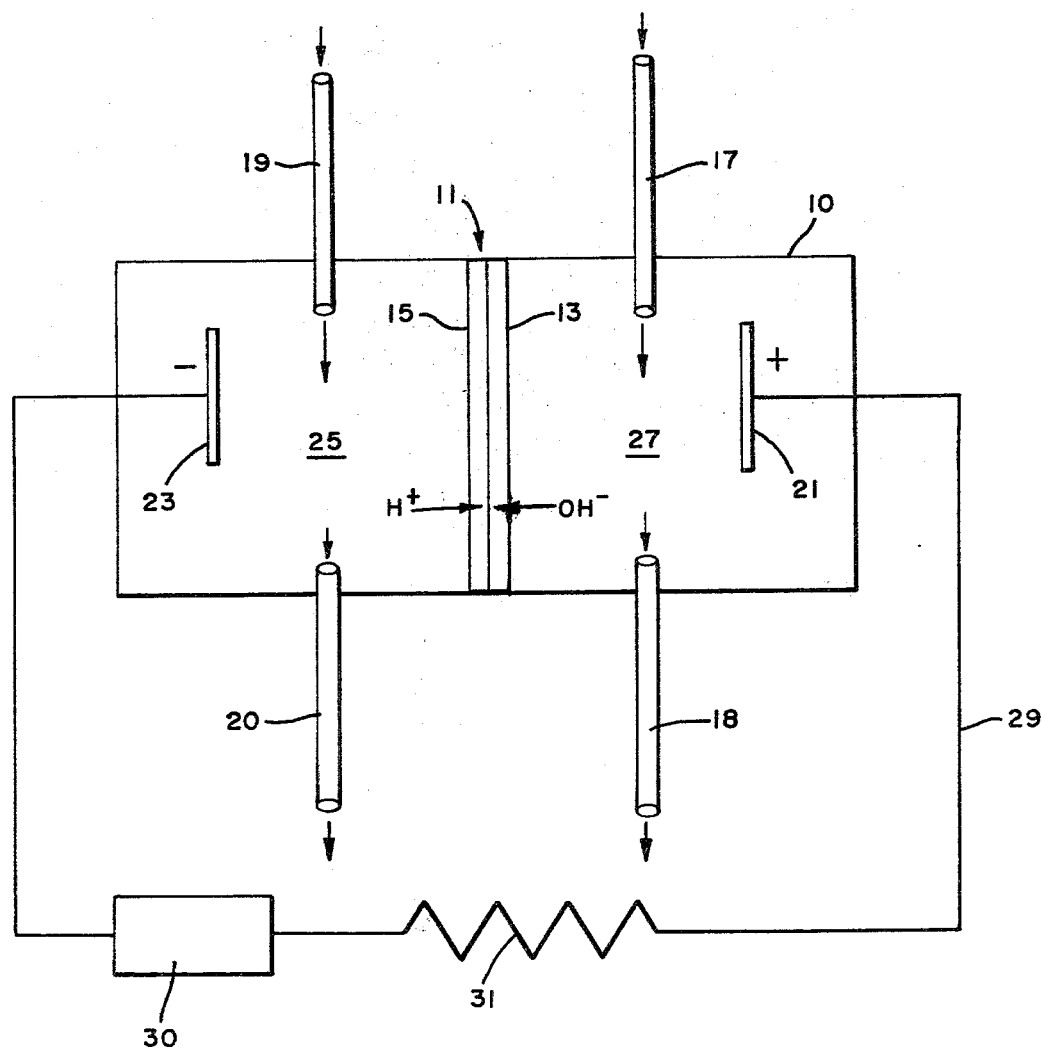
Figure 2:
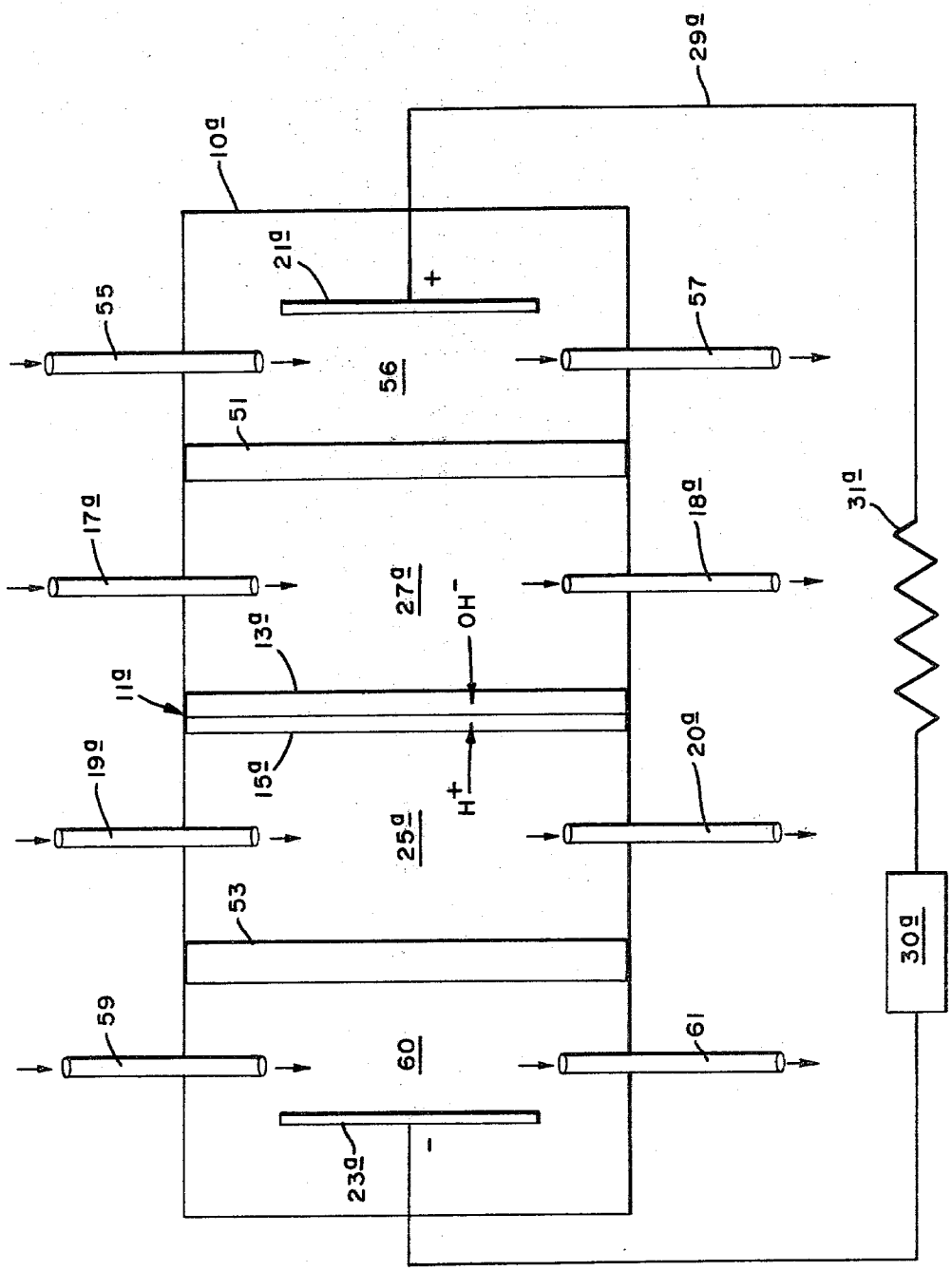

FIG. III is a diagrammatic illustration of a bipolar membrane energy cell having a plurality of unit cells for the production of electrical energy in accordance with the present invention.

In all the Figures, edge views of the membranes and cells are shown.

DETAILED DESCRIPTION OF THE INVENTION

The present invention is concerned with a process for the generation of electrical energy from neutralizations of aqueous acid and base streams through a bipolar membrane. Specifically, it was discovered that by contacting an aqueous acid stream with the cation-permeable face of a bipolar membrane and an aqueous base stream with the anion-permeable face of the membrane, a spontaneous neutralization reaction occurs through the bipolar membrane between acidic cations and basic anions. The result of this neutralization between the acidic cations and basic anions through the bipolar membrane is to thereby generate an electrical potential difference between the acid stream and the base stream. When electrodes are placed in contact with each stream, and conneted to each other electrically, the electrical potential difference is transmitted to and withdrawn from the electrodes. The electrodes conduct useful electrical energy in the form of electrons through the electrical connection to an electrical load, (e.g., a motor,) to do useful work. Multiple energy conversions, i.e. chemical to electrical to mechanical, are well known in the prior art.

The process of the present invention provides an efficient method to create and make use of a potential difference generated by a chemical neutralization reaction through a bipolar membrane; this spontaneous neutralization through the bipolar membrane produces a potential difference which occurs independent of the presence of the electrodes. Moreover, by providing the cell with reversible electrodes, i.e., electrodes which can each operate as anodes and cathodes, the cell can be driven in reverse by an external electrical power source to reform the acid and base streams which can then be stored external to the cell. Thus, by employing reversible electrodes, the process can operate to store electrical energy for regeneration on demand. Such energy storage will prove particularly useful for leveling cyclic power loads in the electrical utilities industry. Another advantage of the process of the present invention is the generation of useful electrical energy by the neutralization of industrial wastes, e.g., acid and base wastes from industrial plants and from neutralization reactions used for chemical manufacture.

As used herein the term "acid" means a substance which, when added to water at 25° C., produces a solution having a concentration of at least about $1 \times 10^{-4}$ mol/liter of hydrogen ions or of cations capable of releasing hydrogen ion. A solution which contains hydrogen ion having a concentration of one mol/liter of solution contains Avogradro's Number of hydrogen ions in one liter of solution.

Among the acidic substances which can be mentioned as useful in the process of this invention are:

strong mineral acids, e.g. aqueous solutions of HCl, HBr, HF, HI, $H_2SO_4$, $H_2SO_3$, $HNO_3$, $HIO_3$, $H_3PO_4$, $H_3PO_3$, $H_4P_2O_7$, $HClO_4$;

strong organic acids, e.g., $CF_3CO_2H$, 2,4,6-$(NO_2)_3C_6H_2OH$;

ammonium salts, e.g., $NH_4^+$, $R_1NH_3^+$, $R_1R_2NH_2^+$ and $R_1R_2R_3NH^+$, and pyridinium, wherein $R_1$, $R_2$ and $R_3$ are alkyl, cycloalkyl, aryl and arylalkyl, containing up to 25 carbons;

water-soluble acidic polyelectrolytes, e.g., polypeptides in their acidic form, polystyrene sulfonic acids, polyacrylic acids;

water-insoluble acidic polyelectrolytes, e.g., proteins in their H+ form, cation exchange resins in their H+ form such as phenolic-types containing alkylsulfonic groups, polystyrene types containing alkylsulfonic acid, polyvinylbenzyltrialkyl ammonium salts and those acidic polyelectrolytes listed in U.S. Pat. No. 3,705,846 at Col. 5, line 7 to Col. 6, line 29 which is hereby incorporated by reference;

and other like acidic substances. Mixtures of these acidic substances can also be effectively employed.

These acidic substances show the common characteristics of (1) producing hydrogen ions or acidic cations which have mobility in an electro chemical potential gradient in aqueous solution; and (2) capability of producing solutions having a concentration of at least about $1 \times 10^{-4}$ mol/liter of hydrogen ion, or cations capable of producing hydrogen ion, when such substances are added to $H_2O$ at 25° C.

Preferred acids are those which produce solutions having a concentration of at least about 0.1 mol/liter of hydrogen ion, or cations capable of producing hydrogen ions, and more preferably solutions having a concentration of at least about 0.1 mol/liter of hydrogen ion. The maximum concentration of hydrogen ion or such cations is determined by the solubility of the acids and/or their effect on membranes, electrolytes, electrodes, etc.

Of course acidic substances which, due to their composition or concentration coat, clog or destroy the surface or pores of the membranes or adversely effect any element of the cell should be avoided.

As used herein the term "base" means a substance which, when added to water at 25° C., produces a solution having a concentration of at least about $1 \times 10^{-4}$ mol/l of hydroxide ions or other basic anions having the capability of neutralizing the hydrogen ions or acidic cations capable of producing hydrogen ions in the operation of the cell.

Among the basic substances which can be mentioned as useful in the process of this invention are:

hydroxides, e.g., hydroxides of Group Ia and IIa metal cations; carboxylates; carbonates, hydrogen carbonates ($HCO_3^-$); sulfates ($SO_4^=$); phosphates ($PO_4^=$); hydrogen phosphates ($HPO_4^=$ and $H_2PO_4^-$); acetates; cyanides; basic hydrated metal ions, i.e., basic hydrated alumium ions; ammonium hydroxide (aqueous ammonia), $R_1NH_2$, $R_1R_2NH$, $R_1R_2R_3N$, wherein $R_1$, $R_2$ and $R_3$ are as described hereinabove; piperazines; pyrrolidines; 1,4-diazabicyclo[2.2.2] octane; hexamethylenediamine; water-soluble basic polyelectrolytes, e.g., polypeptides in their basic form; linear or slightly cross-linked polymers, e.g., polyvinylbenzyl trimethylammonium hydroxide, polyvinylpyridine, poly-N-methylacrylamide; proteins in their basic form; finely pulverized anion-exchange resins in their hydroxide ($OH^-$) form, e.g., strongly basic polystyrene types containing aryl-$CH_2N^-(CH_3)_3$; epoxypolyamides; polyamides; polystyrene or phenolic polyamines; those basic polyelectrolytes listed in U.S. Pat. No. 3,705,846 at Col. 5, line 7 to Col. 6, line 29 which are hereby incorporated by reference; and other like basic substances. Mixtures of these basic substrates can also be effectively employed. Aqueous solution of ammonia and amines, e.g., $R_1R_2R_3N$ may additionally contain an electrolyte to enhance the conductivity of these solutions.

These basic substances all share the common characteristics of (1) producing hydroxide ions or basic anions that are mobile in an electrochemical potential gradient in aqueous solution; and (2) producing solutions having a concentration of at least about $1 \times 10^{-4}$ mol/liter of hydroxide ions or other basic anions capable of reacting with hydrogen ions, or with cations capable of generating hydrogen ions, when added to $H_2O$ at 25° C. Preferred bases are those which produce aqueous solutions having a concentration of at least about 0.1 mol/liter of hydrogen ions or of said basic anions, and more preferably solutions having a concentration of at least about 0.1 mol/liter of hydroxide ion. The maximum concentration of hydroxide ion or such basic anions is determined by the solubility of the bases and/or their effect on the membranes, electrolytes, electrodes, etc.

Of course, the basic substances which, due to their composition or concentration, coat, clog or destroy the surface or pores of the membranes or adversely affect any cell elements should be avoided.

When industrial wastes or efficient streams are utilized as sources of aqueous acid or base some purifications, e.g., filtration, may be required to preserve the integrity of the membranes.

In accordance with this invention, the neutralization reaction which produces electrical potential difference between the aqueous acid and base streams is the reaction through the bipolar membrane or hydrogen ions or acidic cations from the acid stream and hydroxide ions or basic anions from the base stream. The preferred neutralization reaction is the formation of neutral water-molecules from reaction through the bipolar membrane of hydrogen ions from the acid stream with hydroxide ions from the base stream.

Obviously, when the acid stream comprises only a weak acid, e.g., one having less than about $1 \times 10^{-1}$ mol/liter of hydrogen ions, the base stream should preferably comprise a strong base, e.g., one having more than about $1 \times 10^{-1}$ mol/liter of hydroxide ion and vice versa.

The neutralization products formed at the bipolar membrane should not, due to their composition or concentration, coat, clog or destroy the surface or pores of the membranes or adversely affect any cell elements should be avoided.

The bipolar membranes useful in the process of the present invention may conveniently comprise two layers of oppositely charged, highly or weakly dissociated ion exchange materials that are in intimate contact with each other, one layer having high cation-selective permeability and the other layer having high anion-selective permeability. Various kinds of bipolar membranes, e.g., bonded cation and anion laminae, single film, cast or sandwich (with or without resistance lowering electrolytes) bipolar membranes can be utilized in the process of the present invention. The particular bipolar membrane chosen should possess the following characteristics: adequate durability and mechanical strength; high ion-selectively, i.e., at least 80%, preferably at least 90%, in an electrolyte medium of at least about 1 mol/liter; low resistance, i.e., below about 30 ohms-cm$^2$, preferably below 3.0 ohms-cm$^2$. High ion selectivity is particularly important. The higher the ion selectivity and the lower the resistance of the bipolar membrane, the greater the electrical potential difference between the aqueous acid and base streams.

Among the bipolar membranes found particularly useful in the process of the present invention are the single film bipolar membrane and the cast bipolar membrane. The methods for preparing these membranes are described in U.S. Pat. Nos. 4,024,043 and 4,116,889, which are hereby incorporated by reference. The process of the instant invention is not limited to the use of any specific type of membranes, and other bipolar membranes, e.g., polyfluorinated bipolar membranes can be utilized. The limiting feature of bipolar membranes useful in the process of the invention is that their selectivity be sufficient to allow the desired neutralization to occur and potential differences to develop.

Thus, in accordance with the process of the present invention, an electrical potential difference is generated between the acid and base streams by neutralization of an aqueous acid and a base stream through an ion-permselective, preferably a high ion-permselective, bipolar membrane. This electrochemical potential difference is developed between these streams whether or not electrodes are positioned in contact therewith. Electrodes are provided to transform this potential difference between acid and base streams into electronic energy and to conduct this energy to the electrical connecting means, i.e., the external circuit. This transformation is conveniently brought about by oxidation and reduction reactions involving electron exchanges with the two electrodes positioned on opposite faces of the bipolar membrane. These oxidation-reduction reactions, hereinafter called redox reactions, are well-known in the prior art.

While the exact mechanism of this transformation is not known, an electric current, i.e. a flow of electrons is observed when aqueous acid and base streams are neutralized at a bipolar membrane in accordance with the process of this invention. It is believed that the positive and negative potentials are generated respectively at the anion-permselective and cation-permselective faces of the bipolar membrane and are transmitted through the electrolyte solutions by ionic conductance to the respective electrodes. The positive potential is transmitted to the positive electrode, i.e., the cathode; the negative potential to the negative electrode, i.e., the anode. Simultaneously, a reduction reaction occurs at the cathode and an oxidation occurs at the anode. Electrons produced by an oxidation reaction are removed from the cell at the anode, conducted through the electrical connecting means and electrons are introduced to the cell via a reduction reaction at the cathode, completing the electrical circuit.

When the reactions at the electrodes are not compatible with acid and/or base streams and/or bipolar membranes, one or more porous dividers, e.g., porous diaphragms, monopolar ion-permselective membranes or semi-permeable non-ion-selective membranes can be placed between the electrodes and the one or more streams thereby forming separate compartments for the acid and/or base streams as well as for the anode and/or cathode. Additional compartments supplied with compatible electrolytes, e.g., salts, and appropriate porous dividers may be inserted between the electrode compartments and the acid and/or base compartments, and-/or supporting electrolyte may also be introduced directly into the electrode compartment.

For proper operation, the electrodes used in the process of this invention should (1) convert to electronic energy the electrochemical potential difference that is generated by the neutralization reaction through the bipolar membrane and transmitted through the cell; and, (2) conduct this electronic energy, i.e., electrons, into and out of the cell to an electrical connecting means. A wide variety of different useful electrodes, both energy-demanding and energy-supplying, have been found to satisfy these requirements.

The use of energy-supplying electrodes to enhance the acid-base neutralization potential to produce greater electrical energy than available from the neutralization alone has significant, obvious advantages. Of course, the total independent potential difference of the energy-supplying electrodes should not significantly oppose the acid-base potential difference, and preferably these electrode potentials should be additive to the acid-base potentials should be additive to the acid-base potential.

Other electrodes, e.g., energy-demanding electrodes, can also be used in this bipolar membrane cell. These energy-demanding electrode redox reactions are driven solely by the internal acid-base neutralization potentials to produce electrical energy which can be withdrawn from the electrode terminals when the cell is operating in the discharging mode. An important requirement for the selection of this kind of electrode is that the electrode should consume a relatively small portion, preferably less than about 50 percent, of the electrical energy produced by the acid-base neutralization energy. For example, when the acid and base streams are aqueous solutions of 1 molar hydrochloric acid and 1 molar sodium hydroxide, respectively, the sodium hydroxide stream will develop a positive electrical potential of about 0.8 volt relative to the hydrochloric acid stream. Of that 0.8 volt, the electrode system should consume preferably less than about 0.4 volt when current is drawn from the cell.

The specific electrodes chosen can operate in the process of the present invention with only a single bipolar membrane; no porous dividers need be positioned between the electrode and the bipolar membrane unless chemicals undesirably reactive with the membranes, the acid, the base or the electrodes are produced or employed at the electrode.

Exemplary of the energy-supplying electrode materials found useful in the process of the present invention are listed in Table I below.

TABLE I

| Cathode Materials | Anode Materials |
|---|---|
| AgCl | Ag |
|  | Fe |
|  | $H_2$ |
|  | Po |
|  | Zn |
|  | Zn(Hg) |
| AgO | Ag |
|  | $[Co(NH_3)_6]^{+2}$ |
|  | Fe |
|  | $[Fe(CN)_6]^{-4}$ |
|  | Ni |
| $Ag_2O$ | Ag |
|  | Fe |
|  | $[Fe(CN)_6]^{-4}$ |
|  | Pb |
|  | Zn |
| $Co^{+3}$ | Ag |
|  | $[Fe(CN)_6]^{-4}$ |
|  | $H_2$ |
|  | Pb |
|  | Zn |
| $Fe^{+3}$ | Ag |
|  | $Co(NH_3)_6^{+2}$ |
|  | $[Fe(CN)_6]^{-4}$ |
|  | $H_2$ |
|  | Pb |
| $O_2$ | $Cr^{+2}$ |
|  | $Ti^{+3}$ |
|  | $H_2$ |
|  | Pb |
|  | Zn(Hg) |
| $Cl_2$ | $Cr^{+2}$ |
|  | Ag |
|  | $Ti^{+3}$ |
|  | $H_2$ |
|  | Zn (Hg) |

The materials of the left-hand column can be used in conjunction with any of the materials listed in the corresponding portion of the right-hand column to form properly operational energy-supplying electrodes.

Proper operation requires that electrons be conducted to and from the cell through the electrodes. When electrode materials appropriate for the conversion of the potential differences in the acid and base streams into electronic energy by electrode redox reactions do not allow such conduction, inert conductors, e.g., carbon, steel, iron, nickel, silver, gold, platinum, palladium, rhodium, titanium and alloys are supplied as a part of the electrode(s).

For example, when a silver anode is used with HCl on the acid stream side in a cell having a single bipolar membrane having ideal selectivity and a silver (I) oxide cathode is used on the base stream side, the oxide is coated onto a silver rod and the result would be:

|  | Standard Potential, E° |
|---|---|
| Cathode: $Ag_2O + H_2O + 2e^- \rightarrow 2\ Ag + 2\ OH^-$ | 0.344 v. |
| Anode: $2Ag + 2Cl^- \rightarrow 2AgCl + 2e^-$ | −0.222 |
| Neutralization at the bipolar membrane: $2H^+ + 2OH^- \rightarrow 2H_2O$ | 0.828 |
| Total cell potential | 0.950 v. |

In this case, only the HCl would be depleted, the base concentration, in principle, would remain constant, and no soluble salt would be formed. These electrodes, under ideal standard conditions, could add about 0.12 volt to the acid-base neutralization potential (0.828 volt).

Examples of energy-demanding electrode materials useful in the process of the present invention are listed in Table II below.

TABLE II

| Cathode Materials | Anode Materials |
|---|---|
| $H_2O$ | $H_2O$ |
| $H^+$ | $OH^-$ |
| $O_2$ | $H_2$ |
| $Fe^{+3}$ | $Fe^{+2}$ |
| $[Fe(CN)_6]^{-3}$ | $[Fe(CN)_6]^{-4}$ |
| $Co^{+3}$ | $Co^{+2}$ |
| $[Co(NH_6)]^{+3}$ | $[Co(NH_3)_6]^{+2}$ |
| $Cr^{+6}$ (1M NaOH) | $Cr^{+3}$ (2M $H_2SO_4$) |
| $Fe(OH)_2$ | Fe |
| $[Fe\ (ph)_3]^{+3}$ | $[Fe\ (ph)_3]^{+2}$ (a) |
| $Ti^{+4}$ | $Ti^{+3}$ |
| $KI_3$ | $KI_3$ |

(a) ph is o-phenanthroline

Table II presents examples of materials useful as energy-demanding electrodes in the process of this invention.

As with the energy-supplying electrode materials listed in Table I above, relatively inert conductors, as described, may be supplied. For example, when the cathode and anode materials are both $Fe^{+2}/Fe^{+3}$, an inert conductor, e.g., a Pt rod, is used. Of course with the $Fe^{+2}/Fe^{+3}$ system, the original concentrations or activities of both ionic species should be adjusted to minimize the energy required for the conversion of the transmitted neutralization potential difference into electronic energy at these energy-demanding electrodes.

Examples of other cathode and anode materials useful in the process of the present invention are listed in Tables 1 and 2 at page 522 of Volume 3 of the Third Edition of Kirk-Othmer, Encyclopedia of Chemical Technology, J. Wiley & Sons, New York, 1978, which is hereby incorporated by reference.

When separate anode and cathode compartments are formed, as described above, supporting electrolytes, e.g., $Na_2SO_4$, $K_2SO_4$, NaCl, $(NH_4)_2SO_4$ or mixtures thereof can conveniently be supplied to the compartments to increase the conductivity in these compartments and to allow transmission of the potential differences, generated at the bipolar membrane, to the anode and cathode.

Some of the electrode materials listed in Tables I and II above, may have their appropriate oxidation states stabilizes or destabilized by complexing agents so as to make the cathode materials more easily reduced and the anode materials more easily oxidized. Some of the useful complexing agents are $F^-$, $Cl^-$, $Br^-$, $I^-$, $OH^-$, $CN^-$, $NCS^-$, $SCN^-$, $CO$, $H_2O$, $NH_3$, oxalate, o-phenanthroline and its derivatives, bipyridine and its derivatives, pyridine, multifunctional ligands such as ethylenediamine, propylenediamine, ethylenediaminetetraacetate, beta-diketones such as 2,4-pentanedione or mixtures thereof. In addition to these complexing agents, aqueous acids and/or base solutions can be employed to stabilize or solubilize these redox materials. The use of such solutions is well known in the prior art.

The electrode materials listed in Tables I and II above can be part of the solid condenser, or contained in the region immediately adjacent to the conductor, in the form of aqueous solution, e.g., $[Co(NH_3)_6]^{+3}$, $[Fe(CN)_6]^{-3}$ or gases, e.g., $O_2$, $H_2$ or mixtures thereof. When these electrode materials are in the form of aqueous solutions, gases or mixtures thereof, such materials can be stored inside or outside the cell, preferably external to the cell and admixed with the appropriate acid or base streams. The storage of these electrode materials and the aqueous acid and base streams stored external to the cell greatly increases the energy storage capacity of a given size cell compared to systems wherein the reactive materials are stored within the cell. When these electrode materials are incompatible with adjacent acid, base or salt streams one or more porous dividers can be supplied.

The scope of the present invention is not limited by the choice of electrodes. The particular electrodes chosen must merely have the capability of transfering the electrochemical potential difference generated by the process of this invention to the external electrical circuits. Electrodes which destroy this potential difference or clog, coat or destroy the membranes or other cell elements are to be avoided.

While any unit cell operated in accordance with this invention will generate useful electrical energy, it will be apparent that a plurality of unit cells between a single pair of electrodes, each having a bipolar membrane and acid and base streams, will produce an additive result. When such multiple unit cells are employed, an aqueous salt solution, compatible with the acid and base, is generally required to separate the acid stream of one unit cell from the base stream of the adjacent unit. This salt compartment must be capable of allowing the potential difference to be transmitted to the adjacent acid or base compartment. An important requirement for the selection of an electrode system is the same as that for the cell having one or a small number of bipolar membranes i.e., the electrical potential required to drive the electrode systems should be a relatively small portion of the total electrical potential produced by all the unit cells. For example, when the acid, base and salt solutions fed to the unit cells are 1 M sulfuric acid, 1 M sodium hydroxide and 1 M sodium sulfate (or 1 M sodium bisulfate), respectively, each unit cell produces an electrical potential in the approximate range 0.4–0.8 volt depending on the rate at which electrical energy is drawn from the unit cells. When one hundred unit cells are stacked between the electrodes, the total electrical potential available to drive the electrode system is approximately 40–80 volts. The electrode reactions, therefore, would be primarily the electrolysis of water with production of hydrogen gas, hydroxyl ion and the consumption of electrons at the cathode and production of oxygen gas, hydrogen ion and the production of electrons at the anode. Inert electrodes in aqeous solution of sodium sulfate, a supporting electrolyte, require about 2 to 5 volts for the water electrolysis reactions which voltage would be considered a small portion of the total potential produced by the unit cells.

An embodiment of the present invention utilizing only a few unit cells may employ inert electrodes which are supplied with an aqueous solution of reversible redox materials which are continuously recirculated between the anode and cathode compartments. The active cathode and anode materials which are combined in a single solution are thus continuously regenerated during the cell operation in both the charging and discharging directions.

When the energy cell has only a few unit cells, 10 or less, for example, then the more expensive energy-supplying electrode materials such as described hereinabove or recirculating electrode systems may be advantageously used. When a large number of unit cells, e.g., up to one hundred or more, is employed the less expensive energy-demanding electrodes can conveniently be used.

As indicated above, electrical energy can be stored and then a significant portion recovered at a later time through reversible operation of the energy cells. Electrical energy is stored by operating a bipolar membrane cell as a water-splitting electrodialyzer driven by an external power source to produce acid and base solutions from water and the corresponding salt of the acid and base, or depending on the choice of electrode materials to produce acid and/or base solutions from water and reactive electrode material. When a cell is driven externally to store electrical energy, the electrode functions are reversed, the positive electrode becomes the anode and the negative electrode becomes the cathode. The electrical energy is stored in the chemical potential energies of the acid and base streams with respect to their spontaneous tendency to neutralize each other. A significant portion of the stored electrical energy can then be regenerated on demand by allowing the cell to operate in the self-driving direction as described previously. Of course not all of the stored electrical energy is recoverable because, as in any real electrochemical system that is operated at an appreciable rate, some of the electrical energy will be lost as heat due to internal electrical resistance and some will be lost due to chemical reaction inefficiencies (current inefficiencies). Some of the electrical energy supplied for storage will also be lost for the same reasons. The two directions of cell operation, electrical energy storage and electrical energy generation, are operational reverses of each other.

The invention will be more fully understood with reference to the accompanying drawings wherein, in FIG. I, an arrangement of the simplest form of the process of the present invention employing one bipolar membrane (edge view) placed between two electrodes enclosed in container 10 is illustrated. As shown, 11 denotes a bipolar membrane with its anion-permeable side 13, in contact with an aqueous base stream from inlet 17 and its cation-permeable side 15 in contact with an aqueous acid stream from inlet 19. The cell has two electrodes, denoted as positive 21 and negative 23 together with the bipolar membrane 11 therebetween and two solution-holding compartments, 25 for acid and 27 for base. The acid and base streams can be stored within the cell container 10, or alternatively they can flow into the cell from external sources via inlets 19 and 17, respectively. Outlets 20 and 18 are provided for the removal of the streams from acid and base compartments 25 and 27. The composition of each effluent stream depends upon the nature of the reaction between each stream and the specific electrode in contact therewith.

When acid and base solutions in compartments 25 and 27, respectively, are in contact with the appropriate opposite faces of bipolar membrane 11, an electrical potential difference develops between the acid and base solutions as a result of the neutralization reactions through the bipolar membrane between acidic cations, e.g., $H^+$, and basic anions, e.g. $OH^-$. This neutralization reaction results in the formation of water, a covalent molecule and an electrical potential difference is created between the two streams in compartments 27 and 25 on opposite faces of the bipolar electrode; a positive ion, $H^+$, is removed from the acid stream in compartment 25 and a negative ion is removed from the base stream in compartment 27. The potential of the base stream becomes positive with respect to the potential of the acid stream. This electrical potential difference is transmitted to two electrodes 21 and 23 at which reactions occur to compensate for the ions removed by neutralization and which provide electrical energy which is conducted by the electrodes out of the cell. The reaction at the positive electrode 24 will be cathodic and the reaction at the negative electrode 23 will be anodic. The electrical energy is withdrawn from the cell via the electrical connecting means 29 to the load 31 having a circuit interruption means 30.

In an alternate embodiment depicted in FIG. II of the process of the present invention operates in a four compartment cell. Two porous dividers 51 and 53 are positioned on opposite sides of the bipolar membrane 11a thereby forming electrode compartments 56 and 60, a base compartment 27a and acid compartment 25a. The porous dividers can be monopolar ion-exchange membranes, i.e. cation or anion permselective membrane or non-ion-selective semipermeable membranes or diaphragms which allow passage of ions necessary for transfer of electrical potential, e.g., metal cations from the base compartment to the electrode compartment 56 and anions from the acid compartment 25a to the electrode compartment 60, while maintaining proper concentration of ions in the electrode materials and preventing the migration of chemical species reactive with either face of the bipolar membrane. A porous divider 51, e.g., a cation or anion permselective membrane, preferably cation permselective, is placed between the anion face 13a of the bipolar membrane 11a and the positive electrode 21a. The electrode compartment 56 formed thereby is supplied through inlet 55 with a supporting electrolyte compatible with the electrode materials and the cation from the base which cation freely migrates from the base compartment 27a into 56 when the porous divider 51 is a cation-permselective membrane. Alternatively, when 51 is an anion permselective membrane, anions, e.g., $SO_4^=$, from the supporting electrolyte in compartment 56 migrate into 27a.

Another porous divider 53, e.g., a cation or anion permselective membrane, is placed between the cation face 15a of the bipolar membrane 11a and the negative electrode 23a. In a preferred embodiment this porous divider 53 is an anion permselective membrane and the electrode compartment 60 formed thereby is supplied through inlet 5 with a supporting electrolyte compatible with such materials and the anion from the acid, which anion freely migrates from the acid compartment 25a into 60. Outlets 57 and 61 are provided for the effluent supporting electrolytes; outlets 18a and 20a are provided for the effluent streams base and acid compartments 27 and 25a respectively; the composition of these effluent streams depends on the choice of the porous dividers, supporting electrolytes and electrodes in contact with each stream. Alternately, porous dividers 51 and 53 can conveniently both be cation permselective or both be anion permselective as long as they allow the transmission to the electrodes of the electrochemical potential differences generated at the bipolar membranes.

A preferred embodiment of the process of the instant invention incorporating more than one bipolar membrane is shown in FIG. III. Imaginary planes through the centers of the salt solution compartments delineate the repeating unit cells. Although only two unit cells appear in the illustration, it is understood that a large number, even one hundred or more unit cells, connected in series, could be positioned between a single pair of electrodes 121 and 123 placed at opposite ends of the cell. Each unit cell contains, in order, three solution compartments designated as salt, base and acid and three permselective membranes designated as C for cation-permselective, AC for bipolar permselective and A for anion-permselective.

An aqueous base, e.g., NaOH is introduced through line 135 into base compartments 102 and 202 which are bounded by cation permselective membranes 151 and 251 and the anion permselective face of bipolar membranes 111 and 211. Aqueous acid, e.g., HCl is simultaneously introduced into acid compartments 103 and 203 via line 137. The acid compartments are bounded by anion permselective membranes 153 and 253 and by the cation permselective face of bipolar membranes 111 and 211. Salt compartments 101, 201 and 301, bounded by membranes 150, and 151, 153 and 251, 253 and 351, respectively are fed an aqueous solution, e.g., NaCl, via line 130. A neutralization reaction between $H^+$ and $OH^-$ occurs at the bipolar membranes 111 and 211. In accordance with the process of the present invention, a total potential equal to the sum of the neutralization potentials of each unit cell is in fact developed at the two end electrodes of a multi-unit cell. While it is not known how this total potential is developed, it is theorized that each unit cell acts as an individual ionic battery connected in series by salt compartments, instead of by wires, which act as ionic conductors between adjacent unit cells. Thus, just as a multi-cell battery, connected in series by wires, develops a total potential equal to the sum of the individual cell potentials, the neutralization potentials generated in unit cells connected in series by salt compartments to form a multi-unit cell, as shown in FIG. III are cumulative.

The process of the instant invention is not limited to the use of NaOH as the base stream, HCl as the acid stream and NaCl as the salt stream. It is understood that other acids and bases, detailed hereinabove, can be utilized in the process of the present invention. The salts chosen should, of course, be compatible with the acids and bases.

When aqueous salt, base and acid streams, each having about the same concentration, are supplied to each salt, base and acid compartment, respectively, of each unit cell, each unit cell develops approximately the same electrical potential difference across each bipolar membrane shown in FIG. III as that developed in the simplest embodiment shown in FIG. I. As indicated hereinabove, in accordance with the process of the present invention, the potential of the base stream is positive with respect to the potential of the acid stream within the same unit cell. The unit cell potential differences are additive when the unit cells are in series connection through the monopolar permselective membranes and compatible salt solution in the compartments as shown in FIG. III; and therefore, the total electrical potential difference across the entire cell between the electrodes in compartments 156 and 160, each having the appropriate supporting electrolyte, at opposite ends as illustrated in FIG. III, is the sum of all unit cell potentials. This total electrical potential is transmitted to the electrodes at opposite ends of the cell, converted into electrical energy and subsequently conducted through the electrical connecting means 139 through circuit interruption means 130 to an electrical receiving means 131.

The invention will be further described by reference to the following examples the details of which should not be construed as limiting the invention except as may be required by the appended claims.

EXAMPLES

EXAMPLE 1

A two-compartment cell as constructed with a single-film bipolar membrane positioned between a pair of reversible silver/silver chloride electrodes. The bipolar membrane was prepared by the procedure described in U.S. Pat. No. 4,024,043. Both compartments were equipped with inlet and exit ducts for circulating acid and base solutions throught the cell. The electrodes were fabricated by electroplating granular silver metal onto circular platinum disks followed by partial anodization in 1 N NaCl. The electrodes held approximately equal amounts of silver, and the anodization converted approximately half the silver on each electrode into silver chloride. The geometrical area of the electrodes was 10 cm$^2$ as was the exposed area of the bipolar membrane. The spacing between the membrane and each electrode was about 2 mm. A solution of 1 N HCl was circulated continuously through the compartment on the cation-permeable side of the membrane, and a solution containing 1 N NaOH and 0.1 N NaCl was circulated through the compartment on the anion-permeable side of the membrane. Sodium chloride was added to the base solution so that both electrodes would be reversible with respect to chloride ion. Cell voltage was measured between the cell electrode terminals with a digital voltmeter that had an input impedance of 10 megohms. Electrical current generated by the cell was determined from the cell voltage at various known resistance loads connected between the cell terminals.

Open circuit cell voltage was 0.86 volt and the electrode on the base solution side was positive with respect to the electrode on the acid solution side. The cell produced a current of 0.350 A (350 A/m$^2$) at 0.52 volt while discharging through a resistance of 1.5 ohms. This output remained constant until the active electrode materials were consumed. The cell was then recharged at a rate of 0.350 A and 1.08 volts using a DC power supply with the positive side of the supply connected to the electrode on the base solution side of the cell. The cell could be discharged and recharged at various rates many times without apparent degradation in performance. Reversible operation demonstrated the ability to store and regenerate electrical energy.

EXAMPLE 2

In this Example, the apparatus of Example 1 was employed with the following modifications. The electrode on the acid side, i.e., the anode, was silver/silver chloride on a circular platinum disk as described in Example 1. However the electrode on the base side, i.e., the cathode, was fabricated of silver (II) oxide/silver (I) oxide/silver on a circular platinum disk. The solution of 1 N HCl was circulated on the cation face of the bipolar membrane; a solution of 1 N NaOH was circulated on the anion face. The cell system can be written as:

Pt/Ag, AgCl/1 N HCl/bipolar membrane/1 N NaOH/AgO, Ag$_2$O, Ag/Pt. The net cell reaction was:

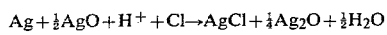

$$Ag + \tfrac{1}{2}AgO + H^+ + Cl^- \rightarrow AgCl + \tfrac{1}{2}Ag_2O + \tfrac{1}{2}H_2O$$

Thus HCl was consumed on the acid side but NaOH was not consumed in the net cell reaction. Reduction of AgO produces hydroxide ion to replace each hydroxide ion neutralized by hydrogen ion through the bipolar membrane.

The actual open circuit potential averaged 1.190 volts and ranged from 1.180 to 1.200 volts, slightly higher than predicted by the calculated standard potential, i.e., 1.18 volts. The cell generated substantially greater power than the cell of Example 1; current generated at peak power was 1.10 A (1100 A/m$^2$) at 0.59 volt. This corresponds to a power output of 650 W/m$^2$. This cell was also readily rechargeable and, therefore, was useful for storing electrical energy.

EXAMPLES 3–5

A plate-and-frame type cell was constructed which had eight solution compartments including two three-compartment unit cells between a pair of end electrodes. The cell comprised, in sequence, a platinum/rhodium cathode, a CMV cation membrane, an AMV anion membrane (both manufactured by Asahi Glass Co.), a single-film bipolar membrane prepared as described in U.S. Pat. No. 4,024,043. The cation permselective side faced the anode. Another CMV cation membrane, another AMV anion membrane, another single-film bipolar membrane with the cation permeable side facing the anode, another CMV cation permeable membrane and a platinum/rhodium anode. The exposed geometrical area of the membranes and electrodes was 10 cm$^2$. All membrane spacings (compartment thickness) and electrode-to-membrane spacings at each end of the cell were 0.058 cm. Flow-through porous electrodes were used which were each constructed of 19 layers of 80-mesh platinum/rhodium (90/10) gauze coated with platinum black. The layers were spot-welded together at their edges to insure electrical continuity. The cell was equipped with the usual inlet and exit ducts so that the test solutions could be recirculated continuously through the cell.

The electrode materials used for this cell consisted of a solution of a ferrocyanide/ferricyanide redox couple continuously recirculated in a closed loop between the cathode and anode compartments; oxidation of the ferrocyanide at the anode was compensated by reduction of ferricyanide at the cathode. The electrodes consumed a relatively small amount of electrical energy, less than 60 mv at a current density of 1000 A/m$^2$. The electrodes had no self-driving capability, i.e., the net electrode potential difference was zero in the absence of the acid-base neutralization potential.

Cell operating voltage and current density were measured as described in Example 1. In three separate experiments, HCl-KOH-KCl feed solutions were tested at equal concentrations of 1, 2, and 4 normal. Open circuit cell voltage was 1.60 volts (0.80 volt per unit cell) with the 1 N solutions, 1.65 volts (0.82 volt per unit cell) with 2 N solutions and 1.79 volts (0.90 volt per unit cell) with 4 N solutions. Potential differences across the individual unit cells were measured with silver/silver chloride wire probes inserted in the salt solution compartments. Peak electrical power produced by the cell with 1 N solutions was 380 W/m$^2$ per two unit cells at 0.80 volt and 480 A/m$^2$. Peak power with 2 N solutions was 445 W/m$^2$ per two unit cells at 0.84 volt and 530 A/m$^2$. Peak power with 4 N solutions was 400 W/m$^2$ per two unit cells at 1.1 volts and 360 A/m$^2$. The drop in performance with 4 N solutions is believed due to fouling of the anion-permeable membranes by the iron cyanide redox ions which leaked into the inner compartments of the cell.

The cell could be charged with an external power supply, i.e., operated as a water-splitting electrodialyzer, to convert KCl and water in HCl and KOH for storage of electrical energy.

EXAMPLES 6-7

The plate-and-frame type cell, described in Examples 3-5 was employed. The acid-base-salt feed system was $H_2SO_4$—NaOH—$Na_2SO_4$. Solution concentrations were tested at 1 and 2 normal. Open circuit cell voltage was 1.50 volts (0.75 volt per unit cell) with the 1 N solutions and 1.50 volt (0.75 volt per unit cell) with 2 N solutions.

What is claimed is:

1. A process for the spontaneous production of electrical energy from the neutralization of acid and base in a cell with a bipolar membrane having a cation-permselective face and an anion-permselective face, said membrane being positioned between two energy-supplying electrodes in electrical connection with one another, said connection having an electrical receiving means to receive electrical energy from said electrodes, which comprises the steps of:
   (a) simultaneously contacting an aqueous acid stream with said cation-permselective face of said bipolar membrane and an aqueous base stream with said anion-permselective face of said bipolar membrane whereby the contact of said acid and said base streams through said faces of said bipolar membrane spontaneously produces a neutralization electrical potential difference between said streams;
   (b) transmitting said neutralization potential difference to the energy-supplying electrodes which are thereby driven to supply an electrode potential difference which enhances said neutralization potential difference; and
   (c) and withdrawing an enhanced electrical energy spontaneously produced thereby from said electrodes through said electrical connecting means to said electrical receiving means.

2. A process as described in claim 1 wherein the cell additionally comprises two electrode compartments formed by positioning a porous divider between each face of said bipolar membrane and each electrode and wherein said electrode compartments are supplied with a supporting electrolyte stream containing a sodium, potassium or ammonium sulfate salt.

3. A process as described in claim 1 wherein the cell additionally comprises one electrode compartment formed by positioning a porous divider between a face of said bipolar membrane and an energy-supplying electrode and wherein said electrode compartment is supplied with a supporting electrolyte stream containing a sodium, potassium or ammonium sulfate salt.

4. A process as described in claims 2 or 3 wherein the porous divider positioned between the anion face of said bipolar membrane and one electrode is a cation-permselective membrane.

5. A process as described in claims 2 or 3 wherein the porous divider positioned between the cation face of said bipolar membrane and one electrode is a cation-permselective membrane.

6. A process as described in claims 2 or 3 wherein the porous divider positioned between the cation face of said bipolar membrane and one electrode is an anion-permselective membrane.

7. A process as described in claim 2 wherein both porous dividers are cation-permselective membranes.

8. A process as described in claim 2 wherein both porous dividers are anion-permselective membranes.

9. A process as described in claims 2 or 3 wherein said acid and base streams are both are stored internal to said cell.

10. A process as described in claims 2 or 3 wherein said acid and base streams are stored external to said cell.

11. A process as described in claim 1 wherein the electrode positioned on the anion face of said bipolar membrane comprises silver (II) oxide/silver (I) oxide and wherein the electrode positioned on the cation face of said bipolar membrane comprises silver/silver chloride.

12. A process as described in claim 1 wherein the electrode positioned on the anion face of said bipolar membrane comprises silver (I) oxide/silver and wherein the electrode positioned on the cation face of said bipolar membrane comprises silver/silver chloride.

* * * * *